United States Patent
Sano et al.

(10) Patent No.: US 8,241,816 B2
(45) Date of Patent: Aug. 14, 2012

(54) FUEL CELL SEPARATOR

(75) Inventors: Seiji Sano, Gotemba (JP); Yuichi Yagami, Susono (JP); Takashi Kajiwara, Gotemba (JP); Hiromichi Sato, Atsugi (JP); Fumihiko Inui, Toyota (JP); Yoshifumi Ota, Susono (JP); Syo Usami, Susono (JP); Shinichi Matsumoto, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1147 days.

(21) Appl. No.: 11/667,921

(22) PCT Filed: Jan. 24, 2006

(86) PCT No.: PCT/IB2006/000110
§ 371 (c)(1),
(2), (4) Date: May 17, 2007

(87) PCT Pub. No.: WO2006/085172
PCT Pub. Date: Aug. 17, 2006

(65) Prior Publication Data
US 2008/0166621 A1    Jul. 10, 2008

(30) Foreign Application Priority Data
Feb. 8, 2005  (JP) ................................. 2005-031821

(51) Int. Cl.
*H01M 2/18*   (2006.01)
*H01M 2/02*   (2006.01)

(52) U.S. Cl. ........................ 429/514; 429/457; 429/458

(58) Field of Classification Search ........... 429/400–535
See application file for complete search history.

(56) References Cited

U.S. PATENT DOCUMENTS

| 4,233,146 | A  * | 11/1980 | Rothmayer et al. ......... 204/255 |
| 4,750,983 | A  * | 6/1988 | Foster et al. ................. 204/627 |
| 6,348,280 | B1 | 2/2002 | Maeda et al. |
| 6,365,295 | B1 | 4/2002 | Matsukawa et al. |
| 2001/0019793 | A1 | 9/2001 | Tsuyoshi |
| 2002/0055028 | A1* | 5/2002 | Ghosh et al. .................... 429/34 |
| 2004/0048139 | A1* | 3/2004 | King ............................... 429/38 |
| 2004/0219418 | A1 | 11/2004 | Mardilovich et al. |

FOREIGN PATENT DOCUMENTS

| DE | 101 27 322 A1 | 12/2002 |
| EP | 1 496 558 A1 | 1/2005 |
| EP | 1 575 107 A2 | 9/2005 |
| JP | A3-276569 | 12/1991 |
| JP | A 6-218275 | 8/1994 |
| JP | A 2001-148252 | 5/2001 |
| JP | A 2004-6104 | 1/2004 |

* cited by examiner

*Primary Examiner* — Basia Ridley
*Assistant Examiner* — James Lee
(74) *Attorney, Agent, or Firm* — Oliff & Berridge, PLC

(57) ABSTRACT

A separator of a fuel cell stack, which has flat surfaces that face MEAs, includes a cathode-side plate, an anode-side plate and an intermediate plate. The intermediate plate has a plurality of oxidant gas supply channel openings that communicate with an oxidant gas supply manifold and oxidant gas supply holes of the cathode-side plate, and a plurality of oxidant gas exhaust channel openings that communicate with an oxidant gas exhaust manifold and oxidant gas exhaust holes of the anode-side plate. The width and spacing of the oxidant gas exhaust channel openings are set to be larger than those of the oxidant gas supply channel openings.

3 Claims, 10 Drawing Sheets

F I G . 2
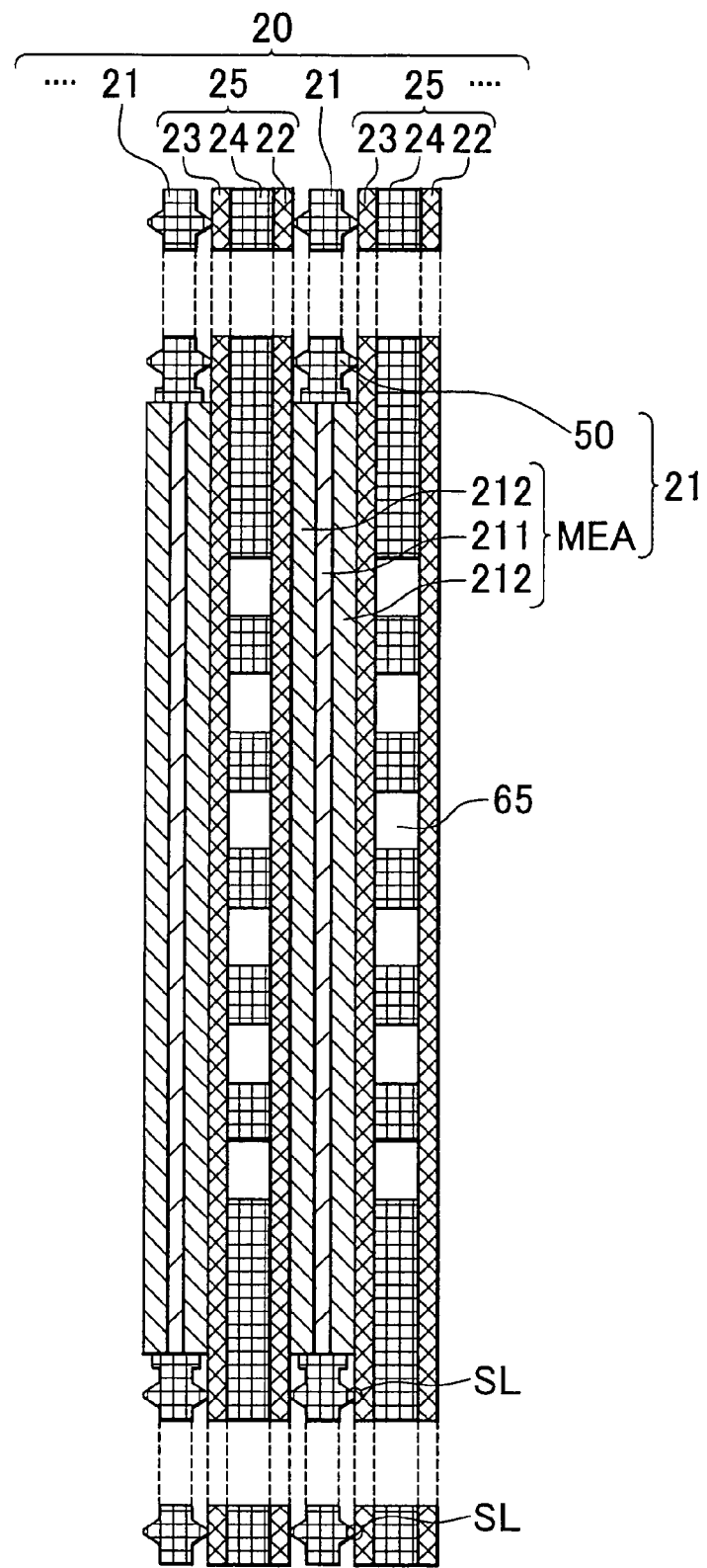

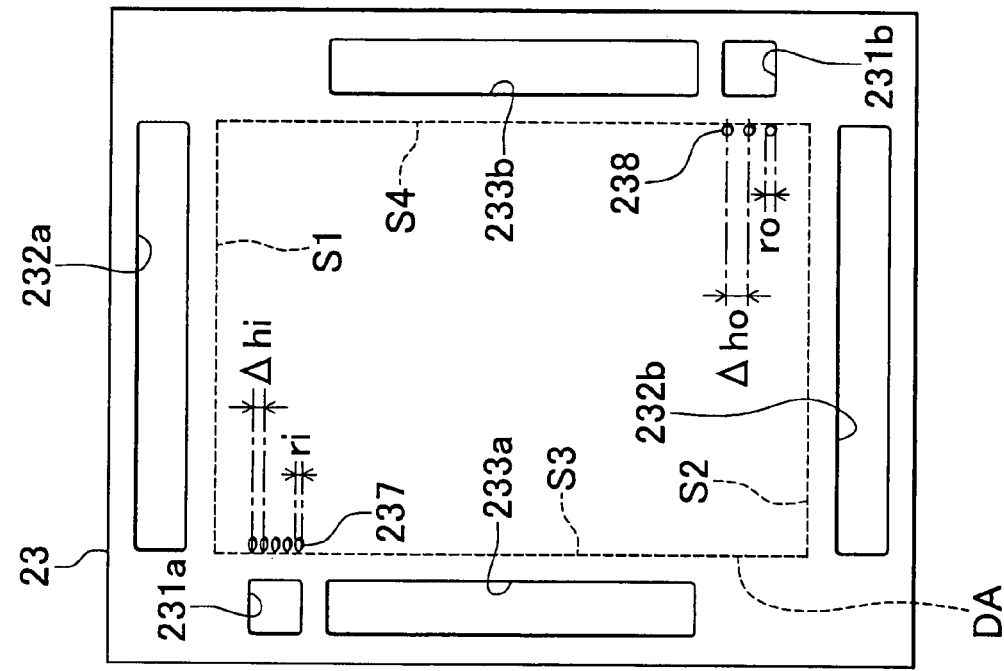
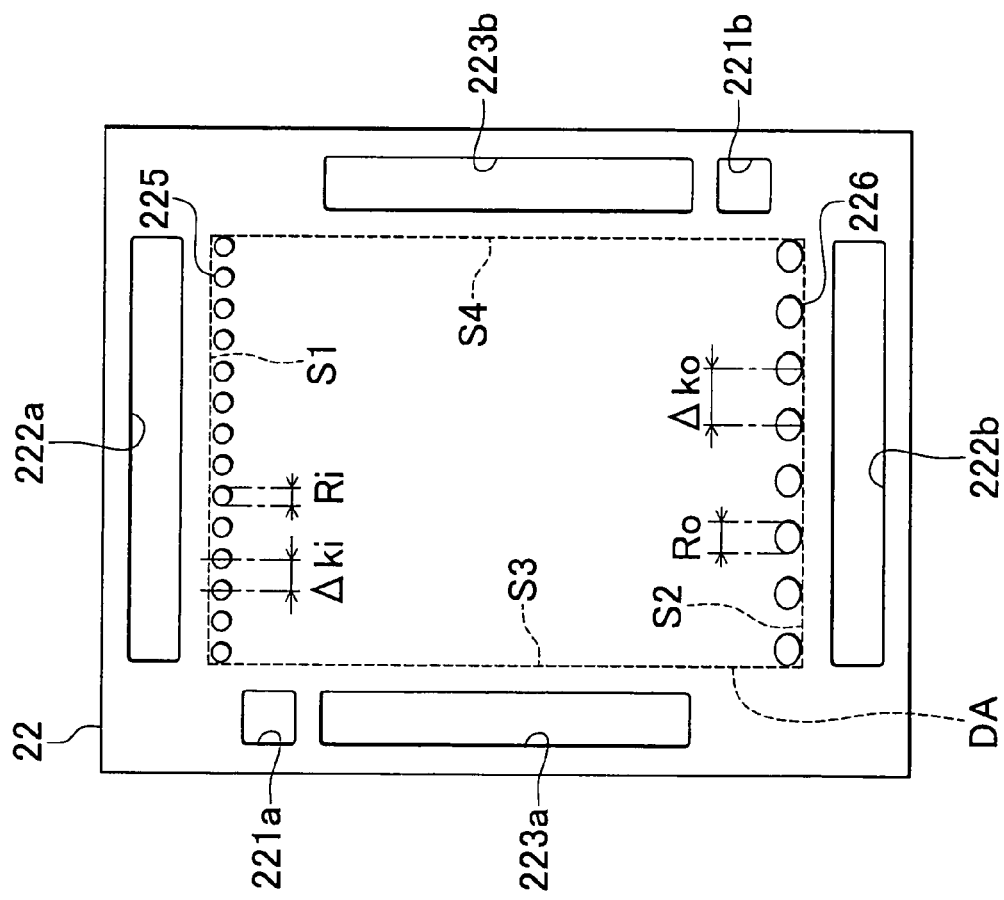

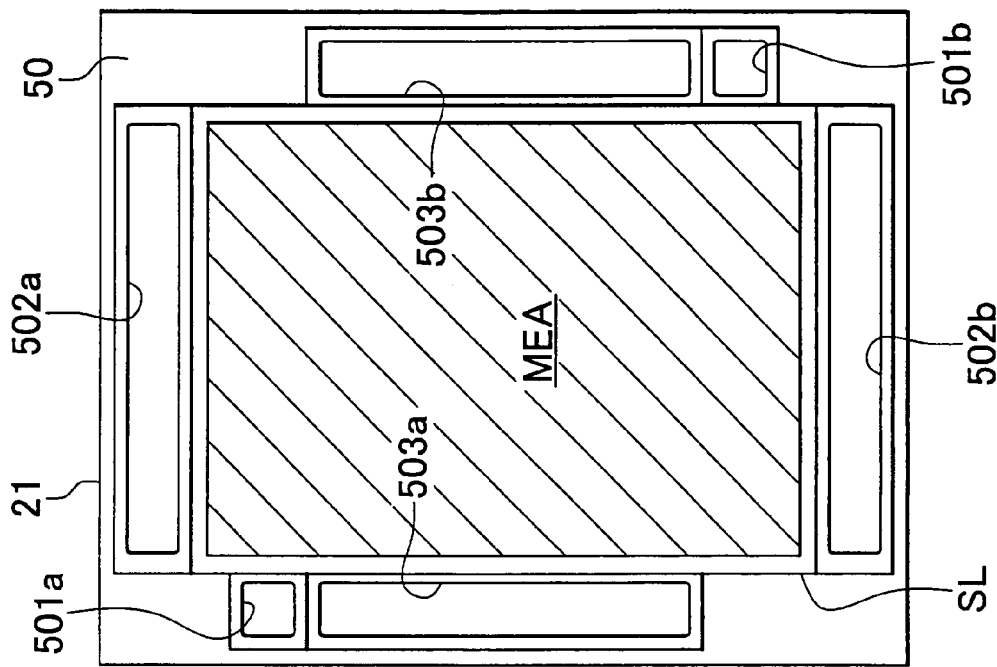
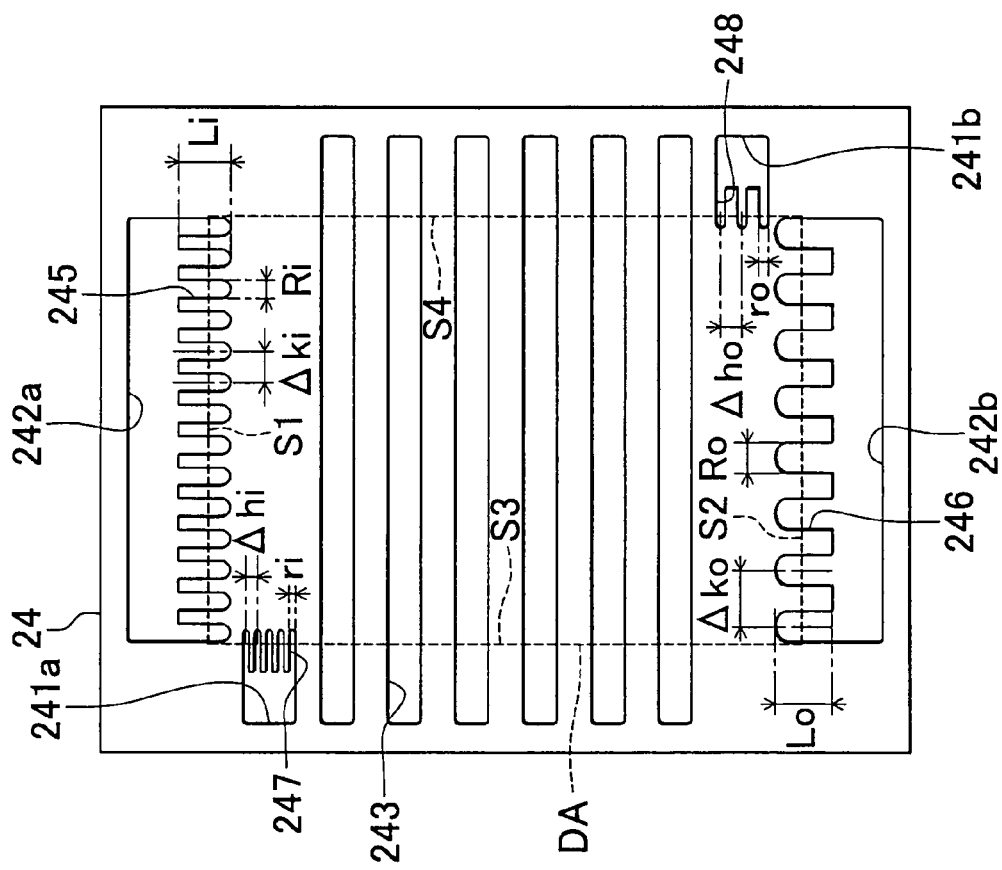

SECTION sl1 – sl1

SECTION sl2 - sl2

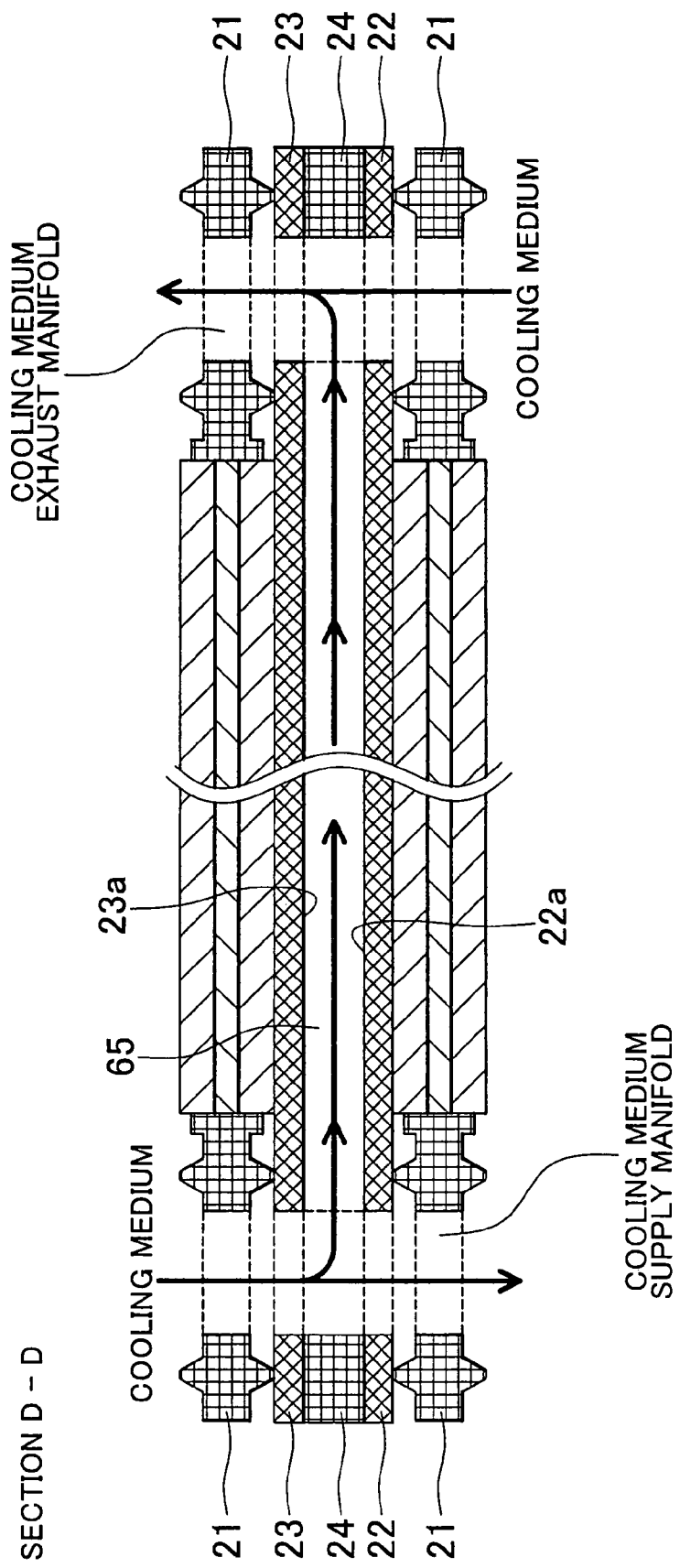

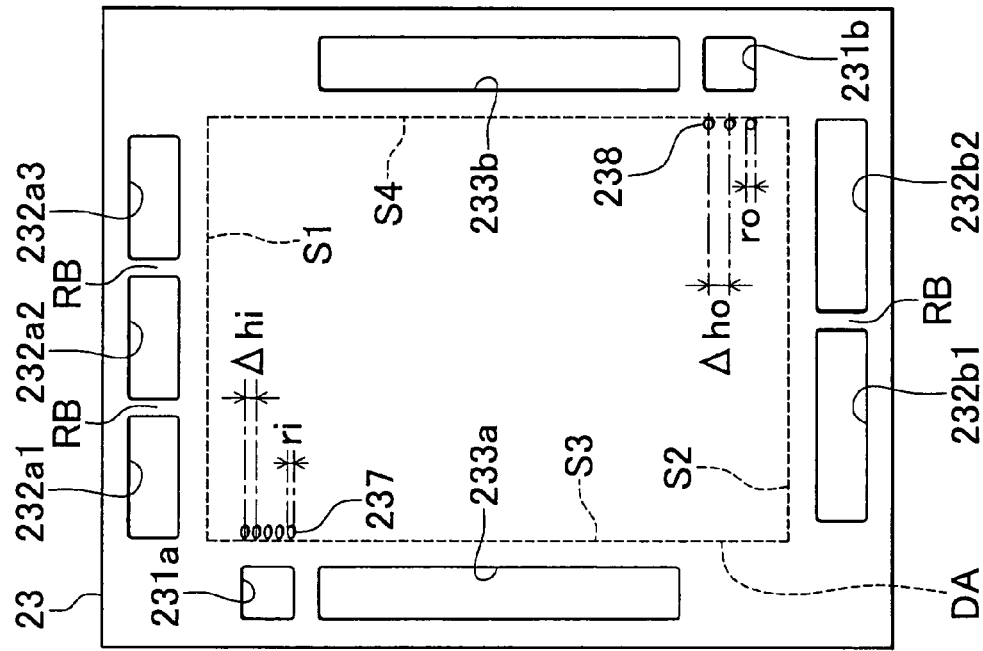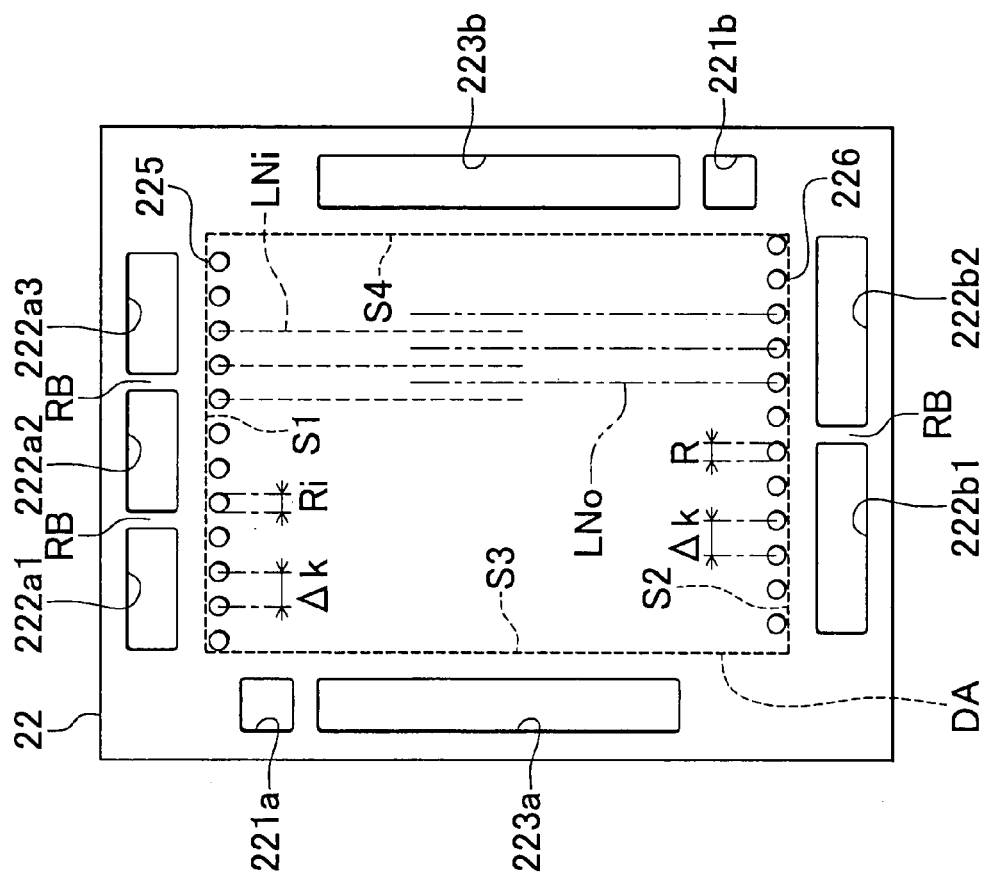

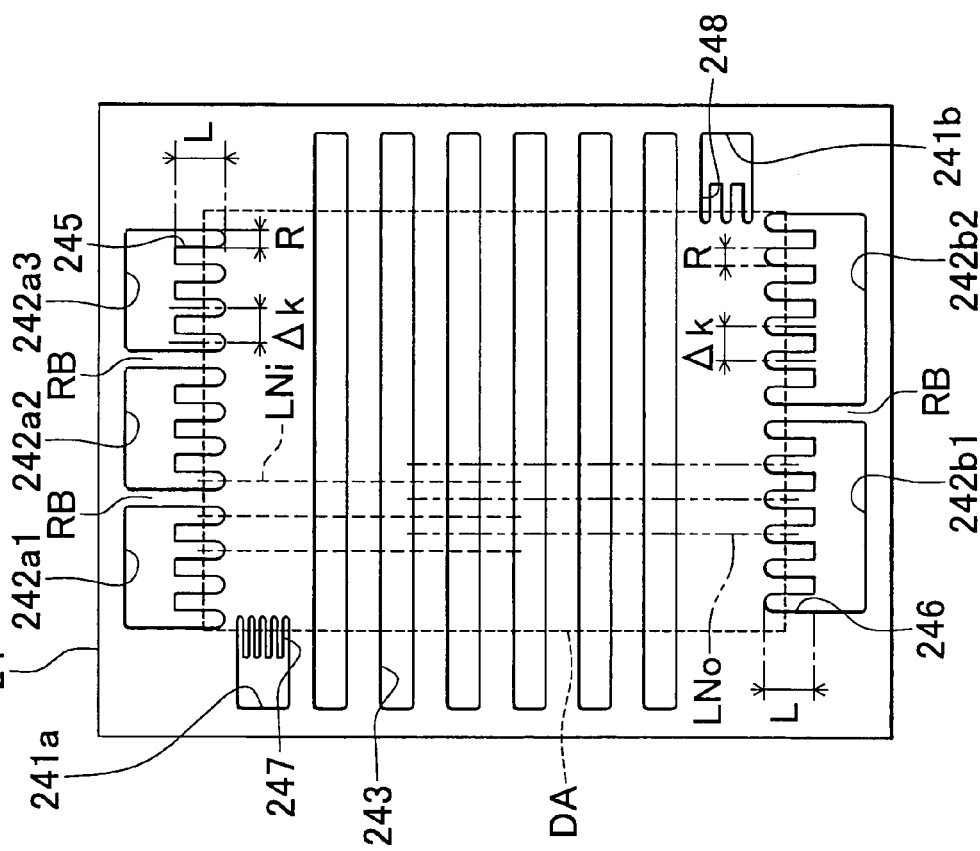

FUEL CELL SEPARATOR

BACKGROUND OF THE INVENTION

1. Field of the Invention

The invention relates to separators for use in a fuel cell stack, and more particularly to supply of reaction gas to fuel cells via the separators.

2. Description of the Related Art

A fuel cell, for example, a solid polymer fuel cell, includes two electrodes (i.e., an oxygen electrode and a fuel electrode) that are opposed to each other, and an electrolyte membrane sandwiched between the two electrodes. By supplying fuel gas containing hydrogen and oxidant gas containing oxygen to the fuel electrode and the oxygen electrode, respectively, reactions as expressed by the following formulae (1) and (2) occur in the fuel cell so as to directly convert chemical energy of the substances into electric energy.

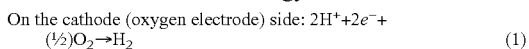
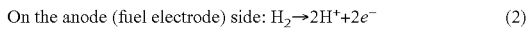

On the cathode (oxygen electrode) side: $2H^+ + 2e^- + (\frac{1}{2})O_2 \rightarrow H_2$ (1)

On the anode (fuel electrode) side: $H_2 \rightarrow 2H^+ + 2e^-$ (2)

As a typical structure of the fuel cells as described above, a stacked structure has been developed in which generally planar, membrane electrode assemblies (MEA) and separators are stacked or laminated together and are fastened or joined together in the stacking direction.

As one type of the separators, a fuel cell separator having a three-layer structure is known which consists of an anode-side plate, a cathode-side plate, and an intermediate plate sandwiched between the anode-side plate and the cathode-side plate. One example of this type of separator is disclosed in, for example, Japanese Laid-open Patent Publication No. 2004-6104. The separator of the three-layer structure as disclosed in this publication has reactant gas manifolds that penetrate the three plates, gas transfer channels formed in the intermediate plate, and through-holes in the form of slits formed in opposite end portions of reactant gas channels formed by half-etching in the anode-side plate and the cathode-side plate. In this arrangement, reactant gas is distributed from the gas transfer channels to the reactant gas channels via the slit-like through-holes.

In the known separator structure as described above, however, the gas transfer channels formed on the reactant-gas supply side have the same configuration and arrangement as the gas transfer channels formed on the reactant-gas exhaust side, and no consideration is given to the case where the gas transfer channels are employed in a separator (hereinafter called "flat separator") in which no reactant gas channels are provided in the anode-side plate and the cathode-side plate. In the case of the flat separator, the use of the gas transfer channels as described above may result in reduced efficiency or uniformity with which the reactant gases are supplied to the respective electrodes. Namely, the flat separator is not provided with reactant gas channels in the anode-side plate and the cathode-side plate, and is thus not able to control distribution of the reactant, gas by means of the reactant gas channels. Accordingly, a technology for improving the uniformity of distribution of the reactant gas has been desired with regard to a structure (e.g., channel arrangement) on the supply side of the reactant gas and a structure on the exhaust side of the reactant gas. In addition to the uniform distribution of the reactant gas, it has been desired to discharge water as a reaction product to the outside of the fuel cell stack with improved efficiency.

SUMMARY OF THE INVENTION

The invention has been developed so as to solve the above-described problem and other problems. It is an object of the invention to provide a flat separator for use in a fuel cell stack, which separator is constructed so as to improve the uniformity with which reactant gases are distributed over the electrodes of the fuel cells and thus enhance the cell performance.

To accomplish at least a part of the above object and/or other object(s), there is provided according to a first aspect of the invention a separator of a fuel cell stack which includes a first-electrode plate having a flat surface that faces a first electrode of a membrane electrode assembly that adjoins the first-electrode plate, a second-electrode plate having a flat surface that faces a second electrode of a membrane electrode assembly that adjoins the second-electrode plate, and an intermediate plate sandwiched between the first-electrode plate and the second-electrode plate. According to the first aspect of the invention, a reactant gas supply manifold and a reactant gas exhaust manifold are formed in the separator so as to penetrate the thicknesses of the first-electrode plate, the second-electrode plate and the intermediate plate. The intermediate plate has a plurality of reactant gas supply channel openings which penetrate the thickness of the intermediate plate and form a plurality of reactant gas supply channels, each of which communicates at one end thereof with the reactant gas supply manifold, and reaches, at the other end thereof, a first end portion of an active region thereof that corresponds to the membrane electrode assembly. The intermediate plate further has a plurality of reactant gas exhaust channel openings which penetrate the thickness of the intermediate plate and form a plurality of reactant gas exhaust channels, each of which communicates at one end thereof with the reactant gas exhaust manifold, and reaches, at the other end thereof, a second end portion of the active region. The first-electrode plate has at least one reaction gas supply hole which penetrates the thickness of the first-electrode plate and communicates with the other ends of the reactant gas supply channels, and at least one reaction gas exhaust hole which penetrates the thickness of the first-electrode plate and communicates with the other ends of the reactant gas exhaust channels. The reactant gas supply channels are arranged at a first channel spacing that is smaller than a predetermined spacing, and the reactant gas exhaust channels have a second channel width that is larger than a predetermined width.

In the separator constructed as described above according to the first aspect of the invention, the spacing between the adjacent reactant gas supply channels is smaller than the predetermined spacing, and, therefore, the reactant gas can be uniformly distributed over the first electrode. Furthermore, since the width of each of the reactant gas exhaust channels is larger than the predetermined width, water as a reaction product of an electrochemical reaction of a fuel cell is prevented from clogging the reaction gas exhaust channels. Consequently, the fuel cell stack using the separator of the invention is less likely to suffer from so-called "flooding".

In one embodiment of the first aspect of the invention, the reactant gas supply channels have a first channel width while the reactant gas exhaust channels are arranged at a second channel spacing, and the above-indicated predetermined spacing is equal to the second channel spacing while the above-indicated predetermined width is equal to the first channel width. In this embodiment, the reaction gas supply channels each having a relatively small width are arranged at relatively small spacings, whereas the reaction gas exhaust channels each having a relatively large width are arranged at relatively large spacings. This channel configuration or arrangement makes it possible to uniformly distribute the reaction gas over the adjoining electrode and suppress the occurrence of "flooding" while assuring sufficiently high rigidity of the separator.

There is provided according to a second aspect of the invention a separator of a fuel cell stack, which includes a first-electrode plate having a flat surface that faces a first electrode of a membrane electrode assembly that adjoins the first-electrode plate, a second-electrode plate having a flat surface that faces a second electrode of a membrane electrode assembly that adjoins the second-electrode plate, and an intermediate plate sandwiched between the first-electrode plate and the second-electrode plate. According to the second aspect of the invention, a reactant gas supply manifold and a reactant gas exhaust manifold are formed in the separator so as to penetrate the thicknesses of the first-electrode plate, the second-electrode plate and the intermediate plate. The intermediate plate has a plurality of reactant gas supply channel openings which penetrate the thickness of the intermediate plate and form a plurality of reactant gas supply channels, each of which communicates at one end thereof with the reactant gas supply manifold, and reaches, at the other end thereof, a first end portion of an active region thereof that corresponds to the membrane electrode assembly. The intermediate plate further has a plurality of reactant gas exhaust channel openings which penetrate the thickness of the intermediate plate and form a plurality of reactant gas exhaust channels, each of which communicates at one end thereof with the reactant gas exhaust manifold, and reaches, at the other end thereof, a second end portion of the active region that is opposed to the first end portion thereof. The first-electrode plate has at least one reaction gas supply hole which penetrates the thickness of the first-electrode plate and communicates with the other ends of the reactant gas supply channels, and at least one reaction gas exhaust hole which penetrates the thickness of the first-electrode plate and communicates with the other ends of the reactant gas exhaust channels. The reactant gas supply channels and the reactant gas exhaust channels are arranged alternately such that the respective reactant gas supply channels are not aligned with the respective reactant gas exhaust holes in a direction in which an array of the reactant gas supply channels and an array of the reactant gas exhaust channels are opposed to each other.

In the separator constructed according to the second aspect of the invention, the reaction gas supplied from the reaction gas supply holes formed in the first end portion of the active region is likely to diffuse into intervenient portions between the adjacent reactant gas supply holes, and, therefore, the reaction gas is distributed over the first electrode with improved uniformity.

In one embodiment of the second aspect of the invention, the reactant gas supply manifold is divided by at least one first rib into a plurality of reactant gas supply manifolds, and the reactant gas exhaust manifold is divided by at least one second rib into a plurality of reactant gas exhaust manifolds. In this embodiment, the above-indicated at least one first rib and the above-indicated at least one second rib are arranged across the active region so as not to be aligned with each other in a direction in which the reactant gas supply manifold and the reactant gas exhaust manifold are opposed to each other. In this arrangement, the provision of the first rib(s) and the second rib(s) leads to increased strength of the separator. Also, the separator includes a first portion or portions in which the first rib(s) is/are formed and therefore the reaction gas supply channel(s) cannot be formed, and a second portion or portions in which the second rib(s) is/are formed and therefore the reaction gas exhaust channel(s) cannot be formed. Since the first portion(s) is/are not aligned with the second portion(s) in the direction in which the reactant gas supply manifold and the reactant gas exhaust manifold are opposed to each other, the provision of the first and second ribs does not give rise to a region or regions over which the reaction gas is not distributed.

In one embodiment of the first or second aspect of the invention, the above-indicated at least one reactant gas supply hole comprises a plurality of reactant gas supply holes, and each of the reactant gas supply channels communicates with at least one of the reactant gas supply holes. In this embodiment, the number of the reactant gas supply holes may be equal to that of the reactant gas supply channels, and the reactant gas supply channels may be in a one-to-one correspondence with the reactant gas supply holes. In this arrangement, the total area of holes or openings that penetrate the thickness of the first-electrode plate can be reduced, as compared with the case where one long hole or opening provides the reaction gas supply hole, thus assuring improved strength of the separator. Consequently, the reactant gas can be stably supplied to the adjoining electrode.

In another embodiment of the first or second aspect of the invention, the reactant gas supply channels are arranged over the entire length of the first end portion of the active region, and the reactant gas exhaust channels are arranged over the entire length of the second end portion of the active region. With this arrangement, the reactant gas flows from the reactant gas supply channels that are arranged over the entire length of the first end portion to the reactant gas exhaust channels that are arranged over the entire length of the second end portion, so that the reactant gas can be supplied over substantially the entire area of the active region corresponding to the membrane electrode assembly. Thus, the reactant gas is distributed over the adjoining electrode with further improved uniformity.

In a further embodiment of the first or second aspect of the invention, the first electrode is a cathode, and the second electrode is an anode. In addition, the reactant gas supply manifold, the reactant gas supply channels and the above-indicated at least one reactant gas supply hole are an oxidant gas supply manifold, a plurality of oxidant gas supply channels and at least one oxidant gas supply hole, respectively, which are provided for supplying an oxidant gas, and the reactant gas exhaust manifold, the reactant gas exhaust channels and the above-indicated at least one reactant gas exhaust hole are an oxidant gas exhaust manifold, a plurality of oxidant gas exhaust channels and at least one oxidant gas exhaust hole, respectively, which are provided for exhausting an oxidant gas. In this embodiment, the oxidant gas, which is less likely to diffuse than the fuel gas, can be distributed over the cathode with improved uniformity.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein:

FIG. 2 is an explanatory view showing the general structure of a module that constitutes the fuel cell stack of FIG. 1;

FIG. 3A and FIG. 3B are plan views of a cathode-side plate and an anode-side plate, respectively, which constitute the separator of the first embodiment;

FIG. 4A and FIG. 4B are plan views of an intermediate plate of the separator of the first embodiment and a seal-integrated type MEA, respectively;

FIG. 7 is a cross-sectional view illustrating section D-D in FIG. 5A;

FIG. 8A and FIG. 8B are plan views of a cathode-side plate and an anode-side plate, respectively, which constitute a separator constructed according to a second embodiment of the invention; and FIG. 9A and FIG. 9B are plan views of an intermediate plate of the separator of the second embodiment and a seal-integrated type MEA, respectively.

DETAILED DESCRIPTION OF THE PREFERRED EMBODIMENTS

Some exemplary embodiments of the separator of the invention will be hereinafter described with reference to the accompanying drawings.

A. First Embodiment

Structures of Fuel Cell Stack and Separator

Figure 1:
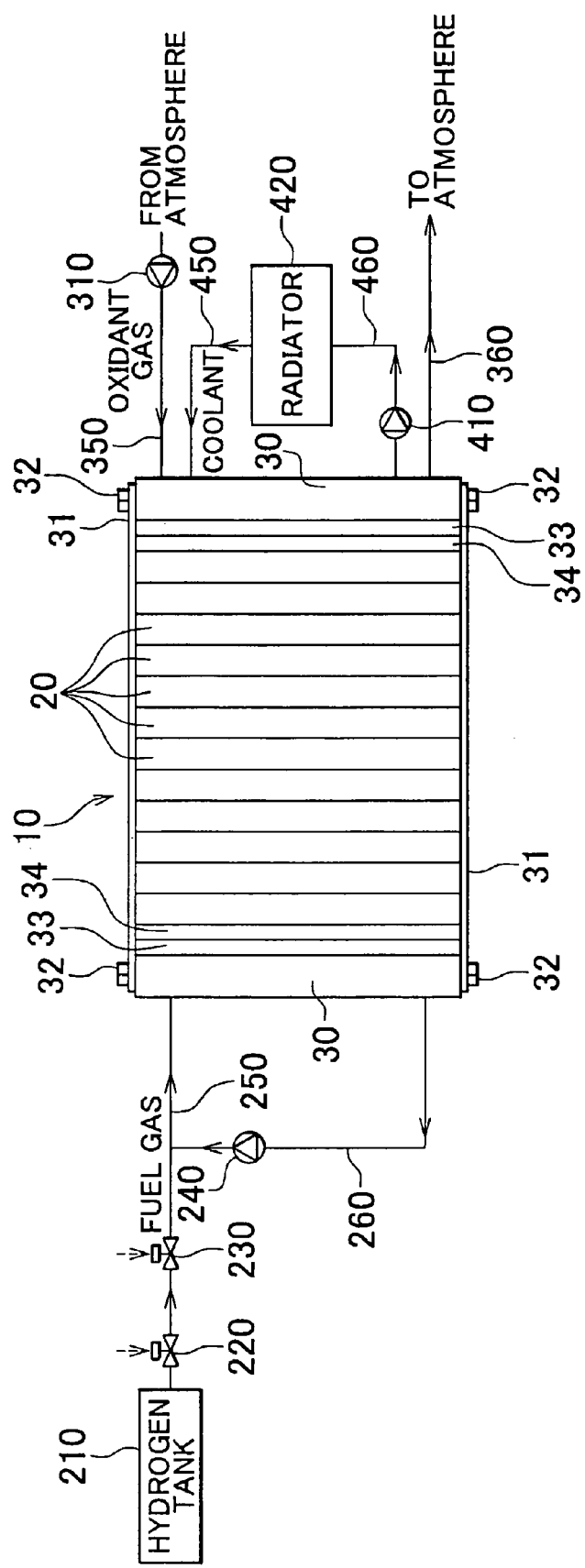
FIG. 1 is an explanatory view showing the external structure of a fuel cell stack constructed by using separators of a first embodiment of the invention.

Referring to FIG. 1 through FIG. 4B, the general structures of a separator constructed in accordance with the first embodiment of the invention and a fuel cell stack using the separators of the first embodiment will be explained. FIG. 1 schematically shows the external structure of the fuel cell stack using the separators of the first embodiment. FIG. 2 schematically shows the structure of a module that constitutes the fuel cell stack of FIG. 1. FIG. 3A and FIG. 3B are plan views of a cathode-side plate and an anode-side plate, respectively, which constitute the separator of the first embodiment. FIG. 4A and FIG. 4B are plan views of an intermediate plate that constitutes the separator of the first embodiment and a seal-integrated type membrane electrode assembly (hereinafter referred to as "MEA" when appropriate), respectively.

The fuel cell stack 10 comprises fuel cells in the form of solid polymer fuel cells, which are relatively small in size and are able to generate electric power with high efficiency. The fuel cell stack 10 includes a plurality of modules 20, end plates 30, tension plates 31, insulators 33 and terminals 34. More specifically, the fuel cell stack 10 has a laminar structure in which the modules 20 are laminated on one another or stacked together. The stacked array of the modules 20 is sandwiched between two end plates 30 such that the insulator 33 and the terminal 34 are interposed between one of the outermost modules 20 and the corresponding end plate 30. The tension plates 31 are screwed to the respective end plates 30 with bolts 32 so that the modules 20 are fastened to each other in the direction of lamination (i.e., in the direction in which the modules 20 are stacked together) under certain compressive force.

The fuel cell stack 10 is supplied with reactant gases (fuel gas and oxidant gas) subjected to cell reactions, and a cooling medium for cooling the fuel cells. To put it briefly, hydrogen as a fuel gas is supplied, via a pipe 250, from a hydrogen tank 210 that stores high pressure hydrogen to the anodes of the fuel cells of the fuel cell stack 10. Instead of using the hydrogen tank 210, hydrogen may be produced through reforming reactions using alcohol or hydrocarbon as a material to be reformed. A shutoff valve 220 and a pressure regulating valve 230 are disposed in the pipe 250 so as to control supply of hydrogen. Hydrogen exhausted from the anodes of the fuel cell stack 10 is returned to the pipe 250 via a pipe 260, and is then fed to the fuel cell stack 10 again. A circulation pump 240 for circulation of hydrogen is disposed on the pipe 260.

On the other hand, air as an oxidant gas is supplied from an air pump 310 to the cathodes of the fuel cells of the fuel cell stack 10 via a pipe 350. Then, air exhausted from the cathodes of the fuel cell stack 10 is released to the atmosphere via a pipe 360. To the fuel cell stack 10 is also supplied a cooling medium from a radiator 420 via a pipe 450. Water, an unfreezing fluid such as ethylene glycol, air or other fluid may be used as the cooling medium. The cooling medium discharged from the fuel cell stack 10 is fed to the radiator 420 via a pipe 460, and is then circulated again to the fuel cell stack 10 via the pipe 450. A circulation pump 410 for circulation of the cooling medium is disposed on the pipe 460.

As shown in FIG. 2, each of the modules 20 of the fuel cell stack 10 is constructed by alternately superposing the separators 25 and the seal-integrated type MEAs 21.

Each of the separators 25 has a cathode-side plate 22 that faces a cathode of the seal-integrated type MEA 21, an anode-side plate 23 that faces an anode of the MEA 21, and an intermediate plate 24 sandwiched between the cathode-side plate 22 and the anode-side plate 23, as shown in FIG. 2. These three plates 22, 24, 23 are superposed on each other and are bound together by hot press.

The separator 25 has a region DA that faces the MEA 21 and cooperates with the MEA 21 to generate electricity when the separators 25 and the MEAs 21 are assembled together to form fuel cells. This region DA will be called "active region" of the separator 25. In FIG. 3 and FIG. 4A, regions defined by dotted lines in generally middle portions of the cathode-side plate 22, anode-side plate 23 and the intermediate plate 24 represent the respective active regions DA.

The cathode-side plate 22 is a generally rectangular, thin plate made of metal. The metallic thin plate is formed of a material having high corrosion resistance. For example, the cathode-side plate 22 may be formed by giving anti-corrosive plating to the surfaces of a titanium plate, titanium alloy (e.g., alloy of titanium and palladium) plate or a SUS (stainless steel) plate. As shown in FIG. 3A, the surface of the cathode-side plate 22 that faces the cathode of the adjoining MEA 21 is a flat surface, in which no oxidant gas flow channels are formed. In FIG. 3A, the upper side of the active region DA having a generally rectangular shape is designated as "first side S1", and the lower side of the same region that is opposed to the first side S1 is designated as "second side S2". Also, the left side (as viewed in FIG. 3A) that adjoins the first side S1 and the second side S2 is designated as "third side S3", and the right side (as viewed in FIG. 3A) that is opposed to the third side S3 is designated as "fourth side S4". The designation of these sides is also applicable to the active region DA of the anode-side plate 23 (which will be described later) and the active region DA of the intermediate plate 24 (which will be described later).

The cathode-side plate 22 has a plurality of oxidant gas supply holes 225 and a plurality of oxidant gas exhaust holes 226. The oxidant gas supply holes 225 are arranged along an end portion (which will be called "oxidant gas supply end portion") of the active region DA that is located adjacent to the first side S1, over the entire length of the oxidant gas supply end portion. The oxidant gas exhaust holes 226 are arranged along an end portion (which will be called "oxidant gas exhaust end portion") of the active region DA that is located adjacent to the second side S2, over the entire length of the oxidant gas exhaust end portion. Thus, the oxidant gas supply holes 225 and the oxidant gas exhaust holes 226 are formed in the longitudinally opposite end portions (as viewed in FIG. 3A) of the active region DA. In this embodiment, the oxidant gas supply holes 225 are arranged along the oxidant gas supply end portion, at predetermined spacings of Δki (which will be called "oxidant gas supply spacing"). The oxidant gas supply holes 225 have the same size and the same shape, and each of the holes 225 has a predetermined width Ri (which will be called "oxidant gas supply width") as viewed in the lateral direction in FIG. 3A. On the other hand, the oxidant gas exhaust holes 226 are arranged along the oxidant gas exhaust end portion, at predetermined spacings of Δko (which will be called "oxidant gas exhaust spacing") which is larger than the above-indicated oxidant gas supply spacing Δki. The oxidant gas exhaust holes 226 have the same size and the same shape, and each of the holes 226 has a predetermined width Ro (which will be called "oxidant gas exhaust width") which is larger than the above-indicated oxidant gas supply width Ri.

Furthermore, the cathode-side plate 22 is formed, in its outer region (which will be called "outer peripheral portion") that surrounds the active region DA, with a fuel gas supply manifold opening 221a, a fuel gas exhaust manifold opening 221b, an oxidant gas supply manifold opening 222a, an oxidant gas exhaust manifold opening 222b, a cooling medium supply manifold opening 223a and a cooling medium exhaust manifold opening 223b. These manifold openings 221a, 221b, 222a, 222b, 223a, 223b form respective manifolds at the time of assembling of the separators 25, as will be described. All of the manifold openings, oxidant gas supply holes 225 and the oxidant gas exhaust holes 226 are through-holes or openings that penetrate the thickness of the cathode-side plate 22. In other words, the manifold openings and the oxidant gas supply and exhaust holes 225, 226 are formed through the cathode-side plate 22 in the direction of the thickness thereof. The cathode-side plate 22 is a flat plate having no particular structure other than these through-holes or openings. Thus, the cathode-side plate 22 may be produced simply by stamping a generally rectangular, thin sheet of metal.

The anode-side plate 23 is a generally rectangular, thin plate made of metal, and has the same size as the cathode-side plate 22. The anode-side plate 23 may be formed of the same material having high corrosion resistance as the cathode-side plate 22. Like the cathode-side plate 22, the surface of the anode-side plate 23 that faces the anode of the adjoining MEA 21 is a flat surface, in which no fuel gas flow channels are formed, as shown in FIG. 3B. The anode-side plate 23 has a plurality of fuel gas supply holes 237 and a plurality of fuel gas exhaust holes 238. The fuel gas supply holes 237 are arranged in the upper part of an end portion (which will be called "fuel gas supply end portion") that is located adjacent to the third side S3 of the active region DA. The fuel gas exhaust holes 238 are arranged in the lower part of an end portion (which will be called "fuel gas exhaust end portion") that is located adjacent to the fourth side S4 of the active region DA. Thus, the fuel gas supply holes 237 and the fuel gas exhaust holes 238 are formed in the laterally opposite end portions (as viewed in FIG. 3B) of the active region DA. The fuel gas supply holes 237 are arranged along the fuel gas supply end portion, at predetermined spacings of Δhi (which will be called "fuel gas supply spacing"). The fuel gas supply holes 237 have the same size and the same shape, and each of the holes 237 has a predetermined width ri (which will be called "fuel gas supply width") as viewed in the vertical direction in FIG. 3B. On the other hand, the fuel gas exhaust holes 238 are arranged along the fuel gas exhaust end portion, at predetermined spacings of Δho (which will be called "fuel gas exhaust spacing") which is larger than the above-indicated fuel gas supply spacing Δhi. The fuel gas exhaust holes 238 have the same size and the same shape, and each of the holes 238 has a predetermined width ro (which will be called "fuel gas exhaust width") which is larger than the above-indicated fuel gas supply width ri.

Furthermore, the anode-side plate 23 has a fuel gas supply manifold opening 231a, a fuel gas exhaust manifold opening 231b, an oxidant gas supply manifold opening 232a, an oxidant gas exhaust manifold opening 232b, a cooling medium supply manifold opening 233a and a cooling medium exhaust manifold opening 233b, which are formed in the same positions as the corresponding manifold openings of the cathode-side plate 22. All of the manifold openings, fuel gas supply holes 237 and the fuel gas exhaust holes 238 are through-holes or openings that penetrate the thickness of the anode-side plate 23. Namely, the manifold openings and the fuel gas supply and exhaust holes 237, 238 are formed through the anode-side plate 23 in the direction of the thickness thereof. The anode-side plate 23 is a flat plate having no particular structure other than these through-holes or openings. Like the cathode-side plate 22, the anode-side plate 23 may be produced simply by stamping a generally rectangular, thin plate of metal.

The intermediate plate 24 is a generally rectangular, thin plate made of metal, and has the same size as the cathode-side plate 22 and the anode-side plate 23. The intermediate plate 24 may be made of the same material as the cathode-side plate 22 and the anode-side plate 23. As shown in FIG. 4A, the intermediate plate 24 has a fuel gas supply manifold opening 241a, a fuel gas exhaust manifold opening 241b, an oxidant gas supply manifold opening 242a and an oxidant gas exhaust manifold opening 242b, which are formed in the same positions as the corresponding manifold openings of the cathode-side plate 22 and the anode-side plate 23.

As shown in FIG. 4A, the intermediate plate 24 is formed with a plurality of oxidant gas supply channel openings 245 in the form of long holes or slits. Each of the oxidant gas supply channel openings 245 communicates at one end thereof with the oxidant gas supply manifold opening 242a, and reaches, at the other end thereof, the oxidant gas supply end portion of the active region DA. The number of the oxidant gas supply channel openings 245 is the same as that of the oxidant gas supply holes 225 of the cathode-side plate 22, and the oxidant gas supply channel openings 245 are in a one-to-one correspondence with the oxidant gas supply holes 225, in other words, the oxidant gas supply channel openings 245 are aligned one by one with the oxidant gas supply holes 225 when the three plates 22, 23, 24 are joined together. The oxidant gas supply channel openings 245 extend in parallel with one another, and are arranged side by side over the entire length of the oxidant gas supply end portion of the active region DA in the same manner in which the oxidant gas supply holes 225 of the cathode-side plate 22 are arranged. Like the oxidant gas supply holes 225, the oxidant gas supply channel openings 245 are arranged at the oxidant gas supply spacings Δki along the oxidant gas supply end portion. The oxidant gas supply channel openings 245 have the same size and the same shape. More specifically, each of the oxidant gas supply channel openings 245 has a channel width of Ri, which is the above-indicated oxidant gas supply width of each of the oxidant gas supply holes 225, and has a channel length of Li, as shown in FIG. 4A.

As shown in FIG. 4A, the intermediate plate 24 is also formed with a plurality of oxidant gas exhaust channel openings 246 in the form of long holes or slits. Each of the oxidant gas exhaust channel openings 246 communicates at one end thereof with the oxidant gas exhaust manifold opening 242b, and reaches, at the other end thereof, the oxidant gas exhaust end portion of the active region DA. The number of the oxidant gas exhaust channel openings 246 is the same as that of the oxidant gas exhaust holes 226 of the cathode-side plate 22, and the oxidant gas exhaust channel openings 246 are in a one-to-one correspondence with the oxidant gas exhaust holes 226, in other words, the oxidant gas exhaust channel openings 246 are aligned one by one with the oxidant gas exhaust holes 226 when the three plates 22, 23, 24 are joined together. The oxidant gas exhaust channel openings 246 extend in parallel with one another, and are arranged side by side over the entire length of the oxidant gas exhaust end portion of the active region DA in the same manner in which the oxidant gas exhaust holes 226 of the cathode-side plate 22 are arranged. Like the oxidant gas exhaust holes 226, the oxidant gas exhaust channel openings 246 are arranged at the oxidant gas exhaust spacings Δko along the oxidant gas exhaust end portion. The oxidant gas exhaust channel openings 246 have the same size and the same shape. More specifically, each of the oxidant gas exhaust channel openings 246 has a channel width of Ro, which is the above-indicated oxidant gas exhaust width of each of the oxidant gas exhaust holes 226, and has a channel length of Lo, as shown in FIG. 4A.

The intermediate plate 24 further has a plurality of fuel gas supply channel openings 247 and a plurality of fuel gas exhaust channel openings 248, which are similar in construction to the above-described oxidant gas supply channel openings 245 and oxidant gas exhaust channel openings 246. Each of the fuel gas supply channel openings 247 communicates at one end thereof with the fuel gas supply manifold opening 241a, and reaches, at the other end thereof, the fuel gas supply end portion of the active region DA. Each of the fuel gas exhaust channel openings 248 communicates at one end thereof with the fuel gas exhaust manifold opening 241b, and reaches, at the other end thereof, the fuel gas exhaust end portion of the active region DA. The fuel gas supply channel openings 247 are in a one-to-one correspondence with the fuel gas supply holes 237 of the anode-side plate 23, and are arranged at the above-indicated fuel gas supply spacings Δhi along the fuel gas supply end portion. Each of the fuel gas supply channel openings 247 has a channel width of ri, which is the above-indicated fuel gas supply width of each of the fuel gas supply holes 237. Similarly, the fuel gas exhaust channel openings 248 are in a one-to-one correspondence with the fuel gas exhaust holes 238 of the anode-side plate 23, and are arranged at the above-indicated fuel gas exhaust spacings Δho along the fuel gas exhaust end portion. Each of the fuel gas exhaust channel openings 248 has a channel width of ro, which is the above-indicated fuel gas exhaust width of each of the fuel gas exhaust holes 238.

As shown in FIG. 4A, the intermediate plate 24 further has a plurality of cooling medium channel openings 243 in the form of long holes that extend from the right-hand end portion to the left-hand end portion of the intermediate plate 24. The cooling medium channel openings 243 that extend in parallel with one another are arranged in the vertical direction as viewed in FIG. 4A, in a region interposed between the fuel gas supply manifold opening 241a and the fuel gas exhaust manifold opening 241b.

All of the above-described manifold openings and channel openings of the intermediate plate 24 are through-holes or openings that penetrate the thickness of the intermediate plate 24. Namely, the manifold openings and channel openings are formed through the intermediate plate 24 in the direction of the thickness thereof. The intermediate plate 24 is a flat plate having no machined portions other than these through-holes or openings. Thus, the intermediate plate 24 may be produced simply by stamping a generally rectangular, thin plate of metal, in the same manner in which the cathode-side plate 22 and the anode-side plate 23 are produced.

In the illustrated embodiment, the oxidant gas supply end portion and the fuel gas supply end portion as described above correspond to the first end portion as mentioned in "SUMMARY OF THE INVENTION" and the appended claims, and the oxidant gas exhaust end portion and the fuel gas exhaust end portion correspond to the second end portion as mentioned in "SUMMARY OF THE INVENTION" and the appended claims. Also, the oxidant gas supply width Ri and the fuel gas supply width ri correspond to the first channel width as mentioned in "SUMMARY OF THE INVENTION" and the appended claims, and the oxidant gas supply spacing Δki and the fuel gas supply spacing Δhi correspond to the first channel spacing as mentioned in "DISCLOSURE OF THE INVENTION" and the appended claims. Furthermore, the oxidant gas exhaust width Ro and the fuel gas exhaust width ro correspond to the second channel width as mentioned in "SUMMARY OF THE INVENTION" and the appended claims, and the oxidant gas exhaust spacing Δko and the fuel gas exhaust spacing Δho correspond to the second channel spacing as mentioned in "SUMMARY OF THE INVENTION" and the appended claims.

As shown in FIG. 4B, the seal-integrated type MEA 21 includes a MEA (membrane electrode assembly), and a seal portion 50 that is joined to the outer peripheral portion of the MEA. As shown in FIG. 2, the MEA has an electrolyte membrane 211 that consists of an ion exchange membrane, an electrode (e.g., anode) (not shown) that consists of a catalyst layer disposed on one of the opposite surfaces of the electrolyte membrane 211, an electrode (e.g., cathode) (not shown) that consists of a catalyst layer disposed on the other surface of the electrolyte membrane 211, and a diffusion layer 212 disposed on the surface of each catalyst layer that faces the adjoining separator. The diffusion layer 212 has a relatively high porosity as measured in the inside thereof, and provides a small pressure loss when reactant gas (oxidant gas or fuel gas) flows through the diffusion layer 212. The diffusion layer 212 on the cathode side is formed from a porous body made of a metal (e.g., titanium), and the diffusion layer 212 on the anode side is formed from a carbon porous body. The diffusion layers 212 will be described in more detail.

The seal portion 50 is formed of a resin material, such as silicone rubber, butyl rubber, or fluororubber. To form the seal portion 50, a die is set such that the outer peripheral portion of the MEA portion is exposed to the cavity of the die, and the resin material is injected into the cavity for injection molding. In this manner, the membrane electrode assembly 21 and the seal portion 50 are joined together with no clearance left therebetween, and the oxidant gas and the fuel gas are prevented from leaking through the junctions of the MEA 21 and the seal portion 50. Like the cathode-side plate 22 and the anode-side plate 23, the seal portion 50 has a fuel gas supply manifold opening 501a, a fuel gas exhaust manifold opening 501b, an oxidant gas supply manifold opening 502a, an oxidant gas exhaust manifold opening 502b, a cooling medium supply manifold opening 503a and a cooling medium exhaust manifold opening 503b. As shown in FIG. 2, the seal portion 50 provides seals as indicated by seal lines SL (in FIG. 4B) between one separator 25 that adjoins one of the opposite surfaces of the MEA 21 and another separator 25 that adjoins the other surface of the MEA 21 in the assemblies of the MEAs 21 and the separators 25 that constitute the fuel cell stack 10. As shown in FIG. 4B, the seal portion 50 provides a seal that circumscribes the outer periphery of the MEA (i.e., the outer periphery of the active region DA of the fuel cell), and also provides seals that circumscribe the outer peripheries of the respective manifolds. For the sake of simplicity, FIG. 4B only shows seal lines SL that connect abutting portions at which the seal portion 50 and the adjoining separators 25 contact with each other.

Figure 5A:
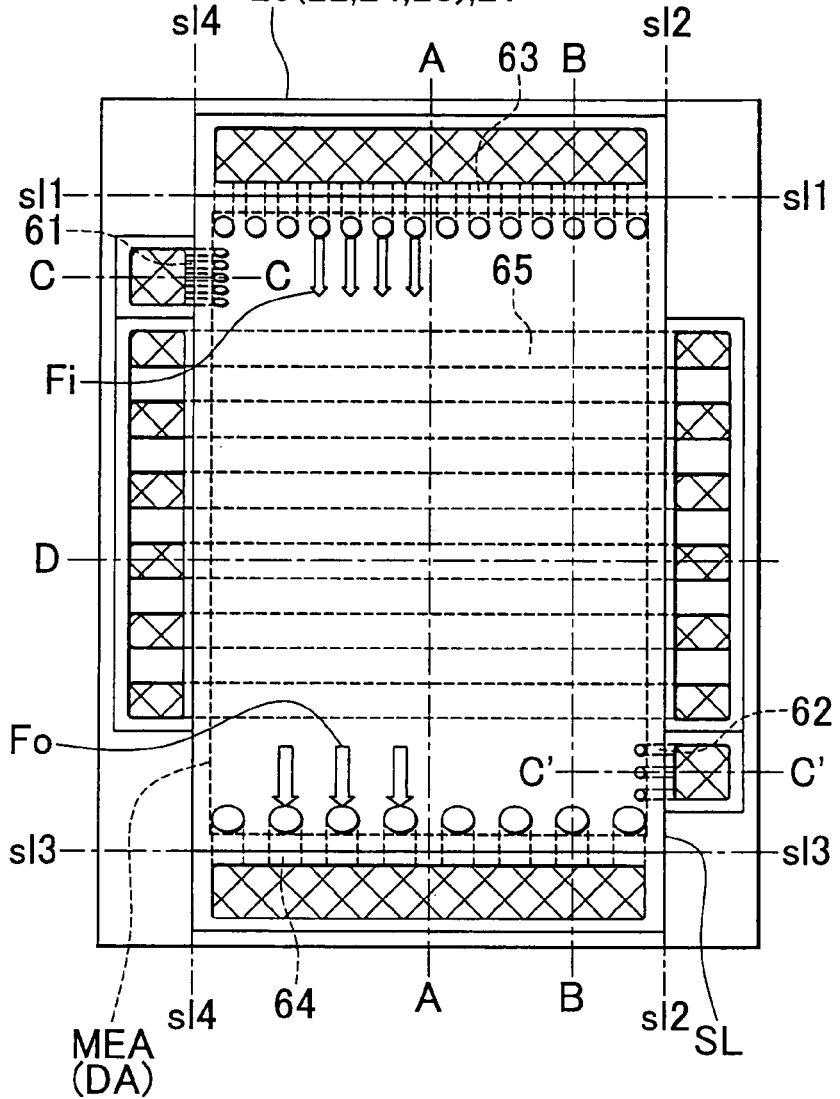
FIG. 5A, FIG. 5B and FIG. 5C are a plan view and cross-sectional views illustrating an assembly of the separator of the first embodiment and the seal-integrated type MEAs superposed on the separator.
Figure 5B:
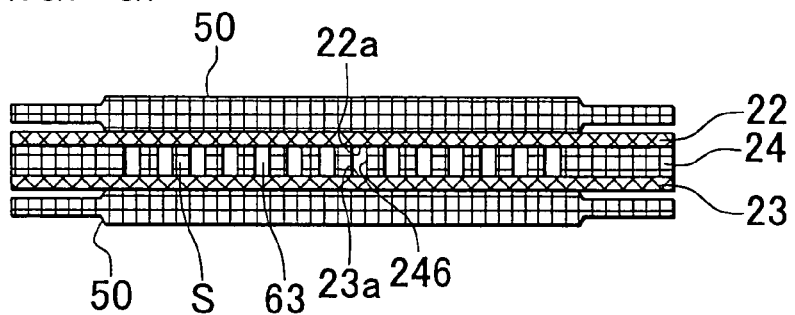
Figure 5C:
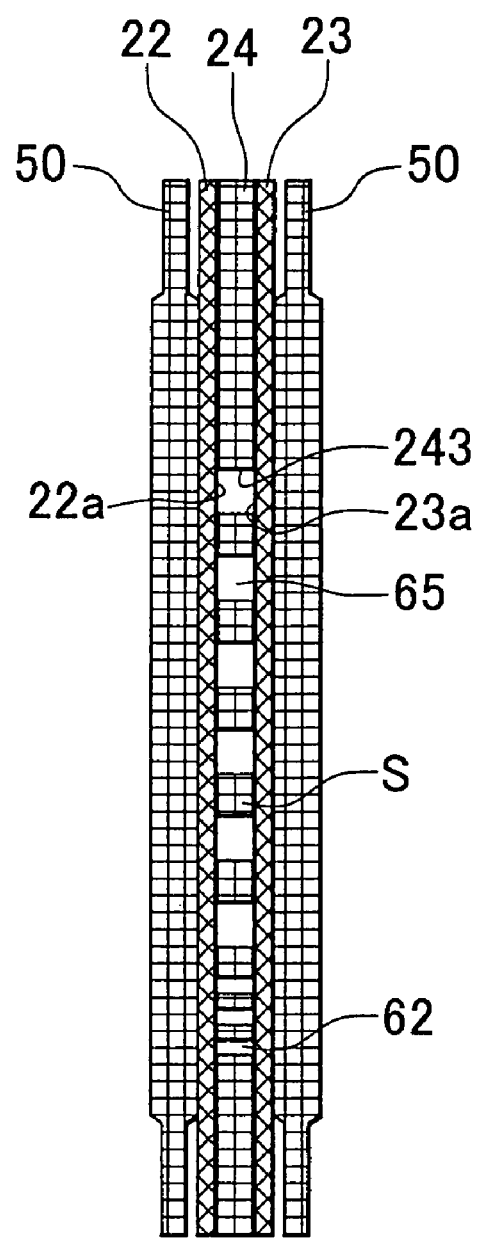
Figure 6:
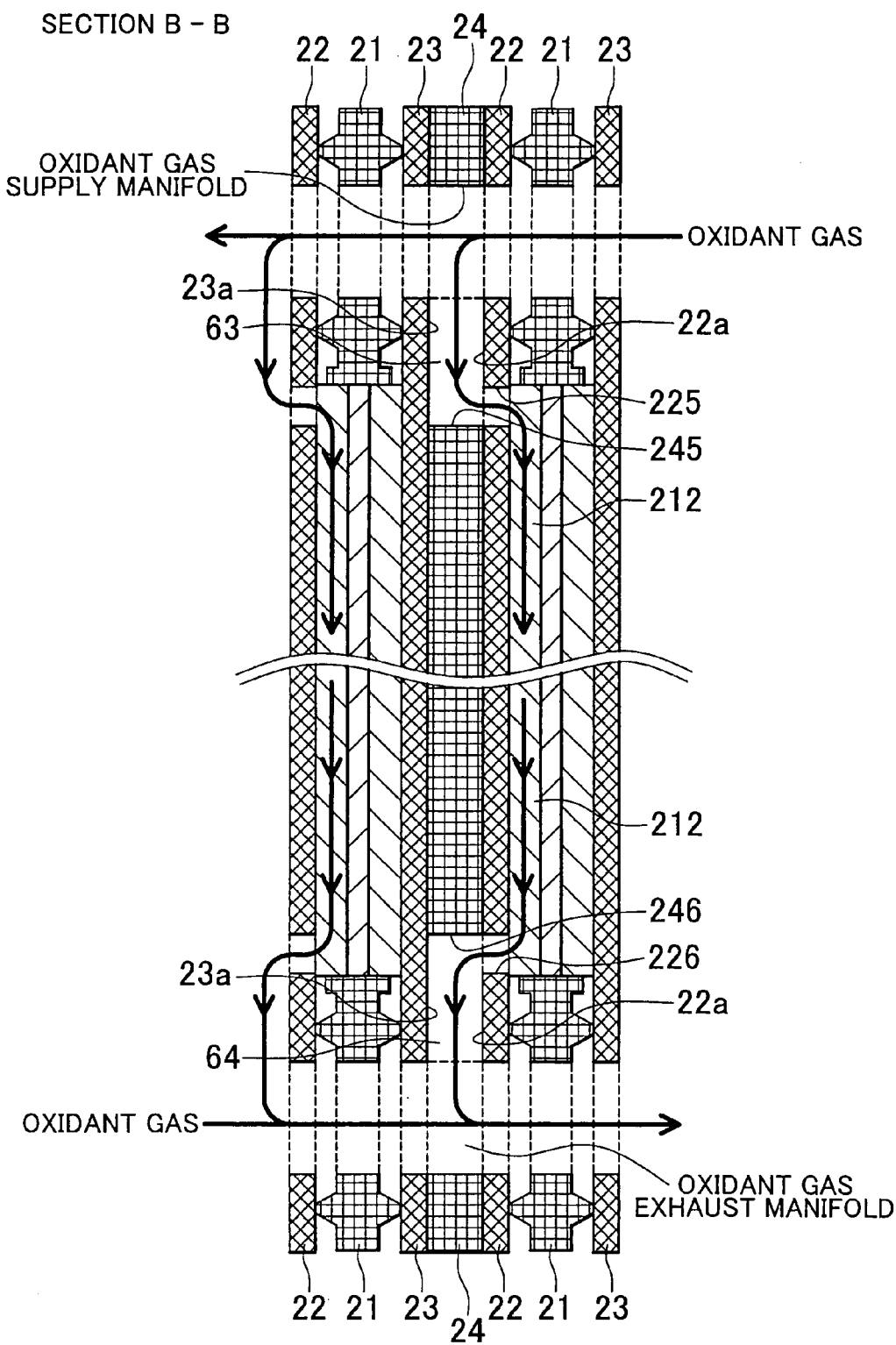
FIG. 6 is a cross-sectional view illustrating section B-B in FIG. 5A.

Referring to FIG. 5A through FIG. 7, the arrangement of various channels formed in the separator 25 will be explained in greater detail. FIG. 5A-FIG. 5C are a plan view and cross-sectional views showing the assembly of the separator of the first embodiment and the seal-integrated MEAs superposed on the separator. FIG. 6 is a cross-sectional view showing a section B-B in FIG. 5A. FIG. 7 is a cross-sectional view showing a section D-D in FIG. 5A. FIG. 2 as indicated above shows a section A-A in FIG. 5A.

The separator 25 is formed with various manifolds that penetrate or extend through the thickness of the separator 25, as indicated by hatched areas in FIG. 5A. More specifically, a fuel gas supply manifold is formed by the fuel gas supply manifold opening 221a, fuel gas supply manifold opening 231a and fuel gas supply manifold opening 241a formed through the cathode-side plate 22, anode-side plate 23, and intermediate plate 24, respectively. In similar manners, a fuel gas exhaust manifold, an oxidant gas supply manifold, an oxidant gas exhaust manifold, a cooling medium supply manifold and a cooling medium exhaust manifold are respectively formed in the separator 25.

As shown in FIG. 5A, the oxidant gas supply manifold is formed over the entire length of the oxidant gas supply end portion in the outer peripheral portion that surrounds the active region DA, such that the oxidant gas supply manifold is opposed to the oxidant gas supply end portion of the active region DA. The oxidant gas exhaust manifold is formed over the entire length of the oxidant gas exhaust end portion in the outer peripheral portion that surrounds the active region DA, such that the oxidant gas exhaust manifold is opposed to the oxidant gas exhaust end portion of the active region DA. Also, the fuel gas supply manifold is formed in the outer peripheral portion that surrounds the active region DA, over a range of the fuel gas supply end portion in which the fuel gas supply holes 237 are located, such that the fuel gas supply manifold is opposed to the fuel gas supply end portion of the active region DA. Similarly, the fuel gas exhaust manifold is formed in the outer peripheral portion that surrounds the active region DA, over a range of the fuel gas exhaust end portion in which the fuel gas exhaust holes 238 are located. The cooling medium supply manifold is formed in the outer peripheral portion that surrounds the active region DA, over a range that covers one of the opposite end portions of the cooling medium channel openings 243. The cooling medium exhaust manifold is formed in the outer peripheral portion that surrounds the active region DA, over a range that covers the other end portions of the cooling medium channel openings 243.

Further explanation will be provided with reference to the cross sections of the assembly of the separator 25 and the seal-integrated type MEAs 21. As shown in FIG. 5A, FIG. 5B and FIG. 6, the oxidant gas supply channel openings 245 formed in the intermediate plate 24 cooperate with the surface 23a of the anode-side plate 23 that adjoins the intermediate plate 24 and the surface 22a of the cathode-side plate 22 that adjoins the intermediate plate 24 to form a plurality of oxidant gas supply channels 63. The oxidant gas supply channels 63 communicate at one end thereof with the oxidant gas supply manifold, and communicate at the other end thereof with the respective oxidant gas supply holes 225 formed in the cathode-side plate 22.

As discussed above, the oxidant gas supply channel openings 245 formed in the intermediate plate 24 have the same shape and the same size. Also, the oxidant gas supply holes 225 have the same shape and the same size, as described above. In operation, therefore, oxidant gas is subject to an equal amount of pressure loss in each of a plurality of paths (which will be called "oxidant gas supply paths") that extend from the oxidant gas supply manifold to the diffusion layer 212 of the adjoining MEA 21 via the oxidant gas supply channels 63 and the oxidant gas supply holes 225.

As shown in FIG. 5A and FIG. 6, the oxidant gas exhaust channel openings 246 formed in the intermediate plate 24 cooperate with the surface 23a of the anode-side plate 23 that adjoins the intermediate plate 24 and the surface 22a of the cathode-side plate 22 that adjoins the intermediate plate 24 to form a plurality of oxidant gas exhaust channels 64. The oxidant gas exhaust channels 64 communicate at one end thereof with the oxidant gas exhaust manifold, and communicate at the other end thereof with the respective oxidant gas exhaust holes 226 formed in the cathode-side plate 22.

Sections taken by one-dot chain lines C-C and C'-C' in FIG. 5A are not illustrated herein, but have structures similar to that shown in section B-B of FIG. 6. More specifically, fuel gas supply channels 61 that communicate with the fuel gas supply manifold and the fuel gas supply holes 237 are formed in a portion of the separator 25 corresponding to section C-C of FIG. 5A, in the same fashion in which the oxidant gas supply channels 63 are formed. Also, fuel gas exhaust channels 62 that communicate with the fuel gas exhaust manifold and the fuel gas exhaust holes 238 are formed in a portion of the separator 25 corresponding to section C'-C' of FIG. 5A, in the same fashion in which the oxidant gas exhaust channels 64 are formed. As described above with respect to the oxidant gas supply channel openings 245 and the oxidant gas supply holes 225, fuel gas is subject to an equal amount of pressure loss in each of fuel gas supply paths including the fuel gas supply channel openings 247 and the fuel gas supply holes 237.

As shown in FIG. 5A, FIG. 5C and FIG. 7, a plurality of cooling medium channels 65 are formed by the cooling medium channel openings 243. The cooling medium channels 65 communicate at one end thereof with the cooling medium supply manifold, and communicate at the other end thereof with the cooling medium exhaust manifold.

The abutting portions of the seal portions 50 with the separators 25 as indicated by seal lines SL in FIG. 4B include an abutting portion (hereinafter called "active-region surrounding seal portion") that surrounds the outer periphery of the active region DA of the fuel cell. As shown in FIG. 5A, the fuel gas supply manifold, fuel gas exhaust manifold, oxidant gas supply manifold and the oxidant gas exhaust manifold are located outside the active-region surrounding seal portion. On the other hand, the oxidant gas supply holes 225, oxidant gas exhaust holes 226, fuel gas supply holes 237 and the fuel gas exhaust holes 238 are located in the end portions of the active region DA, namely, located inside the above-indicated active-region surrounding seal portion. With this arrangement, the fuel gas supply channels 61, fuel gas exhaust channels 62, oxidant gas supply channels 63 and the oxidant gas exhaust channels 64 are formed so as to extend through the interior of the separator 25 while bypassing the active-region surrounding seal portion. Also, the cooling medium channels 65 communicate with the cooling medium supply manifold and cooling medium exhaust manifold which are located outside the active-region surrounding seal portion, and thus extend through the interior of the separator 25 while bypassing the active-region surrounding seal portion.

FIG. 5B illustrates a cross section (section sl1-sl1 in FIG. 5A) of the active-region surrounding seal portion at which the separator 25 and the seal-integrated type MEAs 21 contact with each other. In the cross section of the active-region surrounding seal portion as shown in FIG. 5B, hollow portions (spaces) at which the oxidant gas supply channels 63 are formed and solid portions S are alternately arranged in the lateral direction as viewed in FIG. 5A. Thus, the solid portions S are formed over a certain proportion of the entire length of the seal line sl1-sl1 as indicated in FIG. 5A (namely, a plurality of oxidant gas supply channels 63 are provided at certain spacings), so as to ensure sufficiently high rigidity of the separator 25. With this configuration, the cathode-side plate 22 and the anode-side plate 23 are less likely to be deformed, resulting in improved sealing against the reactant gases and improved stability with which the oxidant gas is supplied through the oxidant gas supply channels 63. It is to be understood that a cross section taken by seal line sl3-sl3 in FIG. 5A has a structure similar to that of the above-described section sl1-sl1.

FIG. 5C illustrates a cross section (section sl2-sl2 in FIG. 5A) of the active-region surrounding seal portion at which the separator 25 and the seal-integrated type MEAs 21 contact with each other. In this section, too, hollow portions (spaces) at which the cooling medium channels 65 and the fuel gas exhaust channels 62 are formed and solid portions S are alternately arranged in the vertical direction as viewed in FIG. 5A. With this arrangement, the solid portions S provide supports for the cathode-side plate 22 and the anode-side plate 23, and otherwise possible deformation of the cathode-side plate 22 and anode-side plate 23 under a sealing pressure is suppressed. It is to be understood that a cross section taken by seal line sl4-sl4 in FIG. 5A has a structure similar to that of the above-described section sl2-sl2.

Operation of Fuel Cell

Referring to FIG. 4A through FIG. 7, the operation of the fuel cell stack that employs the separators of the first embodiment will be explained.

Oxidant gas supplied to the fuel cell stack 10 passes through a plurality of paths (the above-indicated oxidant gas supply paths) comprising the oxidant gas' supply manifold, oxidant gas supply channels 63 and the oxidant gas supply holes 225, and is supplied to the diffusion layers 212 on the cathode sides of the MEAs 21, as indicated by arrows in FIG. 6. Arrows Fi in FIG. 5A represent streams of the oxidant gas supplied from the respective oxidant gas supply holes 225 (i.e., from the respective oxidant gas supply paths). The oxidant gas supplied to the diffusion layers 212 is subject to electrochemical reactions on the cathodes. The oxidant gas is then exhausted to the outside of the fuel cell stack 10 through the oxidant gas exhaust holes 226, oxidant gas exhaust channels 64 and the oxidant gas exhaust manifold, as indicated by arrows in FIG. 6. In FIG. 5A, arrows Fo represent streams of the oxidant gas exhausted from the diffusion layer 212 to the respective oxidant gas exhaust holes 226.

As discussed above, the diffusion layer 212 of each MEA 21 has a high porosity, and oxidant gas flowing through the diffusion layer 212 undergoes a sufficiently small pressure loss. Accordingly, the amounts of the oxidant gas distributed through the respective oxidant gas supply paths and supplied to the cathode depend on pressure losses of the oxidant gas in the respective oxidant gas supply paths. The pressure loss in each of the oxidant gas supply paths is substantially determined by the shapes and dimensions of the oxidant gas supply channel openings 245 and oxidant gas supply holes 225. Thus, the amounts of the oxidant gas distributed through the respective oxidant gas supply paths and supplied to the cathode are controlled by the shapes and dimensions of the oxidant gas supply channel openings 245 and oxidant gas supply holes 225. From this point of view, it is necessary to locate the solid portions S as described above (i.e., locate the oxidant gas supply channels 63 at suitable spacings) so as to ensure sufficient rigidity of the separator structure in the vicinity of the oxidant gas supply channels 63. Otherwise the oxidant gas supply channels 63 would be deformed. If this happens, the pressure loss of the oxidant gas may vary among the oxidant gas supply paths (in other words, the oxidant gas may undergo different pressure losses in the oxidant gas supply paths), and the amounts of oxidant gas flowing through the supply paths may not be controlled as desired.

In the illustrated embodiment, the oxidant gas supply channel openings 245 and the oxidant gas supply holes 225 have the same shapes and dimensions so as to provide an equal pressure loss in each of the oxidant gas supply paths, as explained above with reference to FIG. 3, and, therefore, an equal amount of oxidant gas is supplied to the cathode through each of the oxidant gas supply paths.

Like the oxidant gas, fuel gas supplied to the fuel cell stack 10 passes through a plurality of paths (the above-indicated fuel gas supply paths) comprising the fuel gas supply manifold, fuel gas supply channels 61 and the fuel gas supply holes 237, and is supplied to the diffusion layers 212 on the anode sides of the MEAs 21. The fuel gas supplied to each diffusion layer 212 diffuses over the entire area of the active region DA of the fuel cell (not illustrated), and is subject to an electrochemical reaction on the anode. The fuel gas is then exhausted to the outside of the fuel cell stack 10 through the fuel gas exhaust holes 238, fuel gas exhaust channels 62 and the fuel gas exhaust manifold, in the same manner in which the oxidant gas is exhausted to the outside.

In the fuel gas supply paths, too, the fuel gas supply channel openings 247 and the fuel gas supply holes 237 have the same shapes and dimensions, and, therefore, an equal amount of fuel gas is supplied to the anode through each of the fuel gas supply paths.

The cooling medium supplied to the fuel cell stack 10 passes through the cooling medium supply manifold, cooling medium channels 65 and the cooling medium exhaust, manifold, as indicated by arrows in FIG. 7, and is thus exhausted to the outside of the fuel cell stack 10. The cooling medium absorbs thermal energy of the fuel cells 10 so as to cool the fuel cells mainly when the medium flows within the cooling medium channels 65.

In the separator 25 of the illustrated embodiment, the oxidant gas supply spacing Δki is set to be smaller or narrower than the oxidant gas exhaust spacing Δko so that the oxidant gas is distributed with improved uniformity over the active region DA. While the oxidant gas is less likely to flow in regions between the streams Fi of the oxidant gas supplied from the oxidant gas supply channels 63, as shown in FIG. 5A, the spacing between the adjacent oxidant gas supply channels 63 is reduced so as to reduce the regions in which the oxidant gas is less likely to flow. Although the reduction in the oxidant gas supply spacing Δki leads to improved uniformity with which the oxidant gas is distributed over the active region DA, the reduced spacing Δki may result in a reduction of the total length of the above-described solid portions S (see FIG. 5B) and accordingly reduced rigidity of the separator 25. In view of this possibility, the oxidant gas supply width Ri is also set to be smaller than the oxidant gas exhaust width Ro so that the total length of the solid portions S take up a desired proportion of the entire length of the seal line, thus suppressing reduction of the rigidity of the separator 25.

During power generation of the fuel cells in the fuel cell stack 10, water is produced at the cathodes as a result of electrochemical reactions. The water thus produced is mixed into the oxidant gas. It is desirable that the water mixed into the oxidant gas be quickly discharged, along with the oxidant gas, to the outside of the fuel cell. If the oxidant gas exhaust width Ro is small, however, the oxidant gas exhaust holes 226 or the oxidant gas exhaust channels 64 may be clogged or blocked with water (as a reaction product) collected in the holes or channels. In the illustrated embodiment, the oxidant gas exhaust width Ro is set to be larger than the oxidant gas supply width Ri so that water as a reaction product is discharged with improved efficiency. Although the efficiency of discharge of the water produced is improved with the increase of the oxidant gas exhaust width Ro, the increased width Ro may result in a reduction of the total length of the above-described solid portions S (see FIG. 5B) and accordingly reduced rigidity of the separator 25. In view of this possibility, the oxidant gas exhaust spacing Δko is set to be larger than the oxidant gas supply spacing Oki so that the total length of the solid portions S takes up a desired proportion of the entire length of the seal line, thus suppressing reduction of the rigidity of the separator 25.

To assure sufficiently high rigidity of the separator 25, the oxidant gas supply channels 63 and the oxidant gas exhaust channels 64 need to be formed with appropriate channel widths and channel spacings so that the total length of the solid portions S (see FIG. 5B) as described above take up a desired proportion of the entire length of the seal line. In the illustrated embodiment, the channel widths and channel spacings of the oxidant gas supply channels 63 and oxidant gas exhaust channels 64 are varied relatively between the supply side and the exhaust side, so as to improve the uniformity in the supply of the oxidant gas and the efficiency of discharge of the water produced while assuring sufficient rigidity of the separator 25.

Like the oxidant gas as described above, fuel gas is desirably distributed over the active region DA with sufficiently high uniformity. Also, water produced as a result of electrochemical reactions on the cathode side passes through the electrolyte membrane 211 and enters the anode side. It is therefore desirable that the water as a reaction product be quickly discharged, along with the fuel gas, to the outside of the fuel cell. In the separator 25 of the illustrated embodiment, the fuel gas exhaust width ro and the fuel gas exhaust spacing Δho are set to be larger than the fuel gas supply width ri and the fuel gas supply spacing Δhi, respectively, as is the case with those of the oxidant gas supply/exhaust side. With this configuration, it is possible to supply the fuel gas to the active region DA with improved uniformity and discharge the water produced with improved efficiency while assuring sufficient rigidity of the separator 25. Consequently, so-called flooding can be suppressed during power generation of the fuel cells.

In the illustrated embodiment, the oxidant gas supply channel openings 245 and the oxidant gas supply holes 225 have the same shapes and sizes or dimensions so that an equal pressure loss of the oxidant gas appears in each of the oxidant gas supply paths, and substantially the same amount of the oxidant gas is supplied from each of the oxidant gas supply holes 225. With this configuration, the oxidant gas supplied from the oxidant gas supply holes 225 can be uniformly distributed over the entire area of the active region DA.

Furthermore, in the illustrated embodiment, the oxidant gas supply channel openings 245 are arranged in parallel with each other, over the entire length of the oxidant gas supply end portion of the active region DA (which extends from the left end to the right end of the upper side of the active region DA in the example of FIG. 5A). With this arrangement, the oxidant gas can be supplied to the active region DA with further improved uniformity.

In the illustrated embodiment, the fuel gas supply channel openings 247 are not formed over the entire length of the fuel gas supply end portion of the active region DA. In this connection, it is to be noted that the diffusion speed of hydrogen as the fuel gas is higher than that of oxygen contained in air as the oxidant gas. More specifically, the diffusion speed depends mainly on the diffusion coefficient and the concentration gradient, and the diffusion coefficient of hydrogen is about four times larger than that of oxygen. Also, pure hydrogen is used as the fuel gas (namely, the concentration of hydrogen in the fuel gas is about 100%) whereas air (in which the concentration of oxygen is about 20%) is used as the oxidant gas. It follows that the diffusion speed of oxygen in the oxidant gas is considerably lower than that of hydrogen in the fuel gas. It is therefore possible to supply a sufficient amount of hydrogen required for cell reactions if the fuel gas supply holes 237 are formed in a part of the fuel gas supply end portion of the active region DA. In other words, since oxygen molecules have a relatively low diffusion speed, the rate of the electrochemical reaction of the fuel cell is generally controlled by a reaction $(2H^+ + 2e^- + (1/2)O_2 \rightarrow H_2O)$ that occurs at the three-phase interface of the cathode. Accordingly, the cell performance is improved by arranging the gas supply channels with a particular emphasis on the efficiency or uniformity of the supply of the oxidant gas.

B. Second Embodiment

Referring to FIG. 8A, FIG. 8B, FIG. 9A and FIG. 9B, a separator 25 constructed according to the second embodiment of the invention will be described. FIG. 8A and FIG. 8B are plan views of a cathode-side plate and an anode-side plate, respectively, of the separator of the second embodiment. FIG. 9A and FIG. 9B are plan views of an intermediate plate of the separator of the second embodiment and a seal-integrated MEA, respectively. In the following, the structure of the separator 25 of the second embodiment will be described in detail with respect to some features that are different from those of the separator 25 of the first embodiment, and explanation of other features common to the separators 25 of the first and second embodiments will not be provided herein.

Like the separator 25 of the first embodiment, the separator 25 of the second embodiment is constructed by joining three plates (a cathode-side plate 22, an anode-side plate 23 and an intermediate plate 24) together.

Like the cathode-side plate 22 of the first embodiment, the cathode-side plate 22 of the second embodiment is formed with an oxidant gas supply manifold opening 222a and an oxidant gas exhaust manifold opening 222b. In the second embodiment, however, a portion of the cathode-side plate 22 in which the oxidant gas supply manifold opening 222a is formed is reinforced with two ribs RB, as shown in FIG. 8A. With the ribs RB thus provided, the oxidant gas supply manifold opening 222a of the second embodiment is divided into three oxidant gas supply manifold openings 222a1-222a3. Also, a portion of the cathode-side plate 22 in which the oxidant gas exhaust manifold opening 222b is formed is reinforced with one rib RB, and the oxidant gas exhaust manifold opening 222b is thus divided into two oxidant gas exhaust manifold openings 222b1, 222b2. The two ribs RB that divides the oxidant gas supply manifold opening 222a and the one rib RB that divides the oxidant gas exhaust manifold opening 222b are arranged so as not to be opposed to each other across the active region DA. Namely, the two ribs RB on the supply side and the one rib RB on the exhaust side are arranged across the active region DA so as not to be aligned with each other in a direction (i.e., vertical direction in FIG. 8A) in which the oxidant gas manifold openings 222a1-222a3 and the oxidant gas exhaust manifold openings 222b1, 222b2 are opposed to each other.

As in the first embodiment, the cathode-side plate 22 of the second embodiment has a plurality of oxidant gas supply holes 225 that are arranged over the entire length of the oxidant gas supply end portion of the active region DA, and a plurality of oxidant gas exhaust holes 226 that are arranged over the entire length of the oxidant gas exhaust end portion of the active region DA. In the second embodiment, however, the oxidant gas supply width R and the oxidant gas supply spacing Δk are set to be equal to the oxidant gas exhaust width R and the oxidant gas exhaust spacing Δk. Also, in the second embodiment, the oxidant gas supply holes 225 and the oxidant gas exhaust holes 226 are arranged alternately in the lateral direction in FIG. 8A in the longitudinally opposite end portions (FIG. 8A) of the active region DA. Namely, the respective oxidant gas supply holes 225 and the respective oxidant gas exhaust holes 226 are not aligned with each other in the vertical direction in FIG. 8A, but are shifted in the lateral direction from each other by a distance corresponding to a half of the above-indicated spacing Δk, as indicated in FIG. 8A by broken lines LNi and two-dot chain lines LNo. The broken lines LNi pass the centers of the oxidant gas supply holes 225 and extend toward the oxidant gas exhaust end portion, and the two-dot chain lines LNo pass the centers of the oxidant gas exhaust holes 226 and extend toward the oxidant gas supply end portion. In other words, the oxidant gas exhaust holes 226 are opposed to solid portions of the oxidant gas supply end portion, which solid portions are located between the oxidant gas supply holes 225.

The other structural features of the cathode-side plate 22 of the second embodiment are identical with those of the first embodiment, and thus the same reference numerals as used in FIG. 3A illustrating the first embodiment are used in FIG. 8A for identifying the corresponding elements, of which no explanation will be provided.

Like the anode-side plate 23 of the first embodiment, the anode-side plate 23 of the second embodiment is formed with an oxidant gas supply manifold opening 232a and an oxidant gas exhaust manifold opening 232b. In the second embodiment, however, the oxidant gas supply manifold opening 232a is divided by two ribs RB into three oxidant gas supply manifold openings 232a1-232a3, and the oxidant gas exhaust manifold opening 232b is divided by one rib RB into two oxidant gas exhaust manifold openings 232b1, 232b2, as shown in FIG. 8B, as is the case with the cathode-side plate 22 of the second embodiment as described above.

The other structural features of the anode-side plate 23 of the second embodiment are identical with those of the first embodiment, and thus the same reference numerals as used in FIG. 3B illustrating the first embodiment are used in FIG. 8B for identifying the corresponding elements, of which no explanation will be provided.

Like the intermediate plate 24 of the first embodiment, the intermediate plate 24 of the second embodiment is formed with an oxidant gas supply manifold opening 242a and an oxidant gas exhaust manifold opening 242b. In the intermediate plate 24 of the second embodiment, however, the oxidant gas supply manifold opening 242a is divided by two ribs RB into three oxidant gas supply manifold openings 242a1-242a3, and the oxidant gas exhaust manifold opening 232b is divided by one rib RB into two oxidant gas exhaust manifold openings 242b1, 242b2, as shown in FIG. 9A, as is the case with the cathode-side plate 22 as described above.

As in the first embodiment, the intermediate plate 24 of the second embodiment has a plurality of oxidant gas supply channel openings 245 that are arranged over the entire length of the oxidant gas supply end portion of the active region DA, and a plurality of oxidant gas exhaust channel openings 246 that are arranged over the entire length of the oxidant gas exhaust end portion of the active region DA. The oxidant gas supply channel openings 245 and the oxidant gas exhaust channel openings 246 are respectively aligned with and communicate with the oxidant gas supply holes 225 and oxidant gas exhaust holes 226 of the above-described cathode-side plate 22. Namely, the oxidant gas supply channel openings 245 and the oxidant gas exhaust channel openings 246 are respectively arranged at the spacings Δk, and all of these channel openings 245, 246 have a width of R. The oxidant gas supply channel openings 245 and the oxidant gas exhaust channel openings 246 are arranged alternately in the lateral direction in FIG. 9A across the active region DA so as not to be aligned with each other in the vertical direction in FIG. 9A, as indicated in FIG. 9A by broken lines LNi that pass the centers of the oxidant gas supply channel openings 245 and two-dot chain lines LNo that pass the centers of the oxidant gas exhaust channel openings 246.

The other structural features of the intermediate plate 24 of the second embodiment are identical with those of the first embodiment, and thus the same reference numerals as used in FIG. 4A illustrating the first embodiment are used in FIG. 9A for identifying the corresponding elements, of which no explanation will be provided.

The seal-integrated type MEA 21 of the second embodiment is identical with that of the first embodiment, and thus the same reference numerals as used in FIG. 4B illustrating the first embodiment are used in FIG. 9B for identifying the corresponding elements, of which no explanation will be provided.

In the illustrated embodiment, the ribs RB (formed in each of the three plates) that divide the oxidant gas supply manifold correspond to the first rib(s) as mentioned in "SUMMARY OF THE INVENTION" and the appended claims, and the rib RB (formed in each of the three plates) that divides the oxidant gas exhaust manifold corresponds to the second rib(s) as mentioned in "SUMMARY OF THE INVENTION" and the appended claims.

In the separator 25 of the second embodiment constructed as described above, the oxidant gas supply channels 63 and the oxidant gas exhaust channels 64 are arranged alternately in the lateral direction in FIG. 9A across the active region DA so as not to be aligned with each other in the vertical direction in FIG. 9A, and, therefore, the oxidant gas is distributed over the active region DA with improved uniformity. Although the oxidant gas is less likely to flow in regions interposed between the streams of the oxidant gas supplied from the respective oxidant gas supply channels 63, the oxidant gas exhaust channels 64 located in the intervenient regions cause the oxidant gas to flow into these regions when it is exhausted through the oxidant gas exhaust channels 64. With this arrangement, the area of the active region DA which is not covered with the streams of the oxidant gas is reduced; in other words, the oxidant gas is distributed over the active region DA with improved uniformity.

Like the separators 25 of the first embodiment, the oxidant gas supply channels 63 and the oxidant gas exhaust channels 64 are arranged in parallel with each other with the solid portions S interposed between the adjacent channels, thereby assuring sufficiently high rigidity of the separator 25.

Furthermore, the ribs are provided in the oxidant gas supply manifold and the oxidant gas exhaust manifold, assuring further improved rigidity of the separator 25. Also, the ribs RB in the oxidant gas supply manifold are shifted from the rib RB in the oxidant gas exhaust manifold so that the ribs RB on the supply side and the rib RB on the exhaust side are not aligned with each other in the direction in which the manifolds are opposed to each other. In this connection, it is to be noted that the oxidant gas supply channels 63 and the oxidant gas exhaust channels 64 cannot be formed in portions in which the ribs RB are formed, and that, if the ribs RB on the supply side and the rib RB on the exhaust side were opposed straight to each other, the active region DA would include regions in which the oxidant gas is less likely to flow (i.e., regions interposed between the mutually opposed ribs). In the illustrated embodiment, the ribs on the supply side and the rib on the exhaust side are shifted from each other so as not to be aligned with each other or so as not to be opposed straight to each other, and the above problem may be thus avoided.

C. Modified Examples

The separator 25 of each of the illustrated embodiments is produced simply by stamping three plates, and, therefore, may be formed of various materials other than metals. For example, electrically conductive films or carbon thin plates may be used for forming the separator 25.

While the three plates that constitute the separator 25 are joined together by hot press in the illustrated embodiments, these plates may be joined together by various other methods. For example, various joining methods, such as diffusion bonding, brazing and welding, may be employed.

While the invention has been described in detail with reference to the exemplary embodiments and modified examples thereof, it is to be understood that the invention is not limited to details of the exemplary embodiments and modified examples, but may be otherwise embodied with various changes, modifications or improvements, without departing from the principle of the invention.

The invention claimed is:

1. A separator of a fuel cell stack, comprising
a first-electrode plate having a flat surface that faces a first electrode of a membrane electrode assembly that adjoins the first-electrode plate;
a second-electrode plate having a flat surface that faces a second electrode of a membrane electrode assembly that adjoins the second-electrode plate; and
an intermediate plate sandwiched between the first-electrode plate and the second-electrode plate, wherein:
a reactant gas supply manifold and a reactant gas exhaust manifold are formed in the separator so as to penetrate the thicknesses of the first-electrode plate, the second-electrode plate and the intermediate plate,
the intermediate plate has a plurality of reactant gas supply channel openings which penetrate the thickness of the intermediate plate and form a plurality of reactant gas supply channels, each of which communicates at one end thereof with the reactant gas supply manifold, and reaches, at the other end thereof, a first end portion of an active region,
the intermediate plate further has a plurality of reactant gas exhaust channel openings which penetrate the thickness of the intermediate plate and form a plurality of reactant gas exhaust channels, each of which communicates at one end thereof with the reactant gas exhaust manifold, and reaches, at the other end thereof, a second end portion of the active region,
the first-electrode plate has a plurality of reactant gas supply holes which penetrate the thickness of the first-electrode plate and are aligned to communicate with the other ends of each of the reactant gas supply channels, and a plurality of reactant gas exhaust holes which penetrate the thickness of the first-electrode plate and are aligned to communicate with the other ends of each of the reactant gas exhaust channels,
the reactant gas supply channels are arranged at a first channel spacing, the reactant gas exhaust channels are arranged at a second channel spacing, the first channel spacing is smaller than the second channel spacing, and a length of each of the first channel spacing between adjacent reactant gas supply channels is identical,
the reactant gas supply channels have a first channel width and the reactant gas exhaust channels have a second channel width, the second channel width is larger than the first channel width, and
the reactant gas supply channels are arranged over substantially a same width as the reactant gas supply manifold.

2. The separator as defined in claim 1, wherein:
the reactant gas exhaust channels are arranged over substantially a same width as the reactant gas exhaust manifold.

3. The separator as defined in claim 1, wherein:
the first electrode comprises a cathode,
the second electrode comprises an anode,
the reactant gas supply manifold and the reactant gas supply channels are an oxidant gas supply manifold and a plurality of oxidant gas supply channels, respectively, which are provided for supplying an oxidant gas, and
the reactant gas exhaust manifold and the reactant gas exhaust channels are an oxidant gas exhaust manifold and a plurality of oxidant gas exhaust channels, respectively, which are provided for exhausting the oxidant gas.

* * * * *